United States Patent [19]

Murata et al.

[11] Patent Number: 4,973,892
[45] Date of Patent: Nov. 27, 1990

[54] ENERGIZATION SYSTEM FOR LINEAR MOTOR TRANSIENT REDUCTION

[75] Inventors: Kiwamu Murata, Takatsuki; Jun Nishiyama, Amagasaki, both of Japan

[73] Assignee: Tsubakimoto Chain Co., Japan

[21] Appl. No.: 481,942

[22] Filed: Feb. 28, 1990

[30] Foreign Application Priority Data

Feb. 28, 1989 [JP] Japan .................... 1-45119

[51] Int. Cl.$^5$ .......................... H02K 41/03; F41B 6/00
[52] U.S. Cl. .................................. 318/135; 310/12; 310/49 R; 318/687
[58] Field of Search ................. 310/12, 13, 49 R, 162, 310/166; 318/101, 135, 138, 685, 687, 696

[56] References Cited

U.S. PATENT DOCUMENTS 3,906,262  9/1975  Shichida et al. .................... 318/135
4,928,572  5/1990  Scott et al. ......................... 318/135

FOREIGN PATENT DOCUMENTS 141789  11/1981  Japan .

Primary Examiner—Steven L. Stephan
Assistant Examiner—D. L. Rebsch
Attorney, Agent, or Firm—Howson & Howson

[57] ABSTRACT

In a linear motor comprising a moving body and a plurality of electromagnets arranged along the path of the moving body, the electromagnets are divided into blocks, each block comprising one or more electromagnets which are energized simultaneously. The blocks are energized sequentially with the time lag between energizations of sequentially energized blocks being sufficient to allow the current in each block to reach substantially its steady state level before the next block is energized. When starting the linear motor, a first block is energized, and a transient state occurs in which the current drawn by the first block is higher than the steady state current drawn by the first block. At the end of the transient state of the first block, a second block is energized. Third and fourth are energized similarly, each block being energized only when the transient state of the preceding block is substantially over, i.e. when the current drawn by the preceding block is substantially at its steady state level. The blocks are sequentially deenergized so that the total current drawn on the power supply is limited to the steady state current of two blocks plus the transient current of one block.

10 Claims, 3 Drawing Sheets

ENERGIZATION SYSTEM FOR LINEAR MOTOR TRANSIENT REDUCTION

BRIEF SUMMARY OF THE INVENTION

This invention relates to linear motors and more specifically to an improved system for electrical energization of the electromagnets of a linear motor whereby the peak current draw on the power supply is reduced.

Linear induction motors are being used increasingly as prime movers for such applications as conveyors, transportation, reciprocating pumps, and various other applications. In a typical linear induction motor, a plurality of electromagnets are disposed along the path of a moving body. In starting the linear motor, with the moving body initially stationary, one or more of the electromagnets immediately adjacent to the moving body are energized. At the same time, one or more electromagnets ahead of the moving body are energized. When the moving body is stationary or just beginning its acceleration from a standing position, the starting current drawn by each electromagnet when initially energized is substantially greater than its steady state current. Therefore, when electromagnets ahead of the moving body and electromagnets immediately adjacent to the moving body are energized simultaneously, the total current drawn from the power supply is very high, at least for a short interval. The power supply must have the capacity to deliver the high total starting current. Otherwise, starting of the motor will cause a voltage drop in the power supply system which may have adverse effects on other facilities. The high total starting current in a linear induction motor, therefore, imposes a high cost on the power supply system.

The principal object of this invention is to reduce the cost of the power supply in a linear motor without significantly impairing the performance of the motor. It is also an object of the invention to reduce the peak starting current in a linear motor. Other objects of the invention include the avoidance of the adverse effects of power supply voltage drop in starting a linear motor, and generally to provide a simple and highly efficient starting system.

The foregoing objects are achieved in accordance with this invention essentially by energizing a series of blocks of electromagnets sequentially instead of energizing a large number of electromagnets all at the same time. In accordance with the invention, in a linear motor comprising a moving body and a plurality of electromagnets arranged along the path of the moving body, the electromagnets are divided into blocks, each block comprising one or more electromagnets which are energized simultaneously, and the blocks are energized sequentially with the time lag between energizations of sequentially energized blocks being sufficient to allow the current in each block to reach substantially its steady state level before the next block is energized. Thus, when starting the linear motor, a first block is energized, and a transient state occurs in which the current drawn by the first block is higher than the steady state current drawn by the first block. At the end of the transient state of the first block, a second block is energized. Third and fourth blocks are energized similarly, each block being energized only when the transient state of the preceding block is substantially over, i.e. when the current drawn by the preceding block is substantially at its steady state level. So that the total current drawn is limited to the steady state current of two blocks plus the transient current of one block, the first block is deenergized either before, or at the same time, the fourth block is energized.

Since the transient state of each block takes place only for a very short interval, it is possible to energize the blocks successively without adversely affecting performance of the linear motor.

Other objects of the invention will be apparent from the following detailed description when read in conjunction with the drawings.

DETAILED DESCRIPTION

Figure 6:
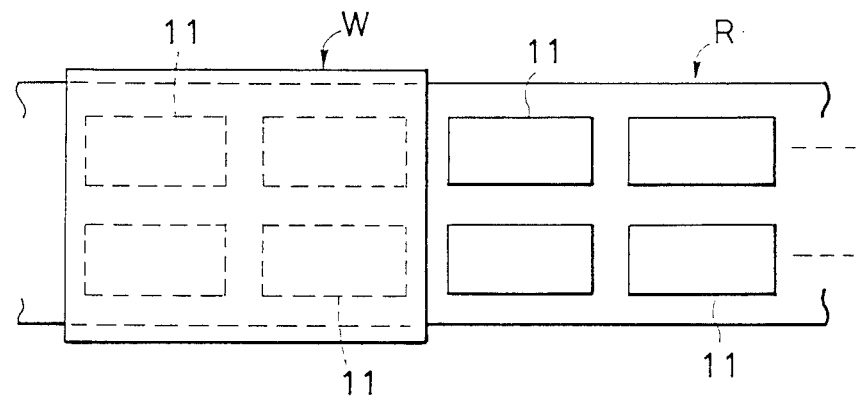
FIG. 6 is a diagrammatic plan view of a conveyor incorporating a conventional linear induction motor in accordance with the prior art.

Referring first to FIG. 6, a typical linear motor in accordance with the prior art comprises a plurality of primary electromagnets 11 arranged along the path R of a moving body W. The moving body W is initially located above four primary electromagnets 11 as shown. Starting current is supplied to six primary electromagnets simultaneously, namely the four electromagnets underneath the moving body and the two electromagnets immediately ahead of the moving body. The current drawn by an electromagnet when it is initially switched on, assuming the moving body is stationary or moving slowly, is typically approximately twice the steady state current. Thus the current initially drawn on the power supply by the motor of FIG. 6 is as much as twelve times the normal steady state current of a single primary electromagnet. With the system of FIG. 6, to avoid the adverse effects of a power supply voltage drop during start-up of the motor, a large-capacity power supply is necessary.

Figure 1:
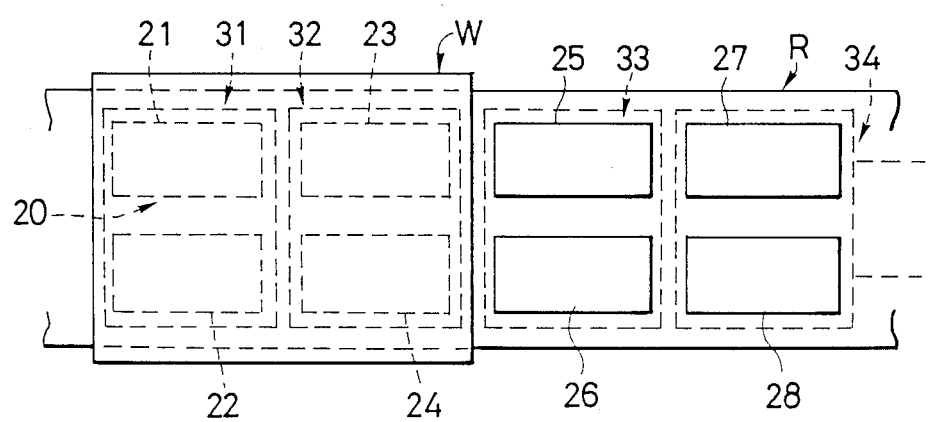
FIG. 1 is a diagrammatic plan view of a portion of a conveyor incorporating a linear induction motor comprising a series of electromagnet blocks and a moving body in accordance with the invention.

In the conveyor of FIG. 1, the linear induction motor 20 comprises a plurality of primary electromagnets 21-28 arranged along the path R of a moving body W. The electromagnets are arranged in groups referred to as "blocks", there being a first block 31 comprising electromagnets 21 and 22, a second block 32 comprising electromagnets 23 and 24, a third block 33 comprising electromagnets 25 and 26, and a fourth block 34 comprising electromagnets 27 and 28. All of the primary electromagnets in a given block are energized simultaneously.

Figure 2:
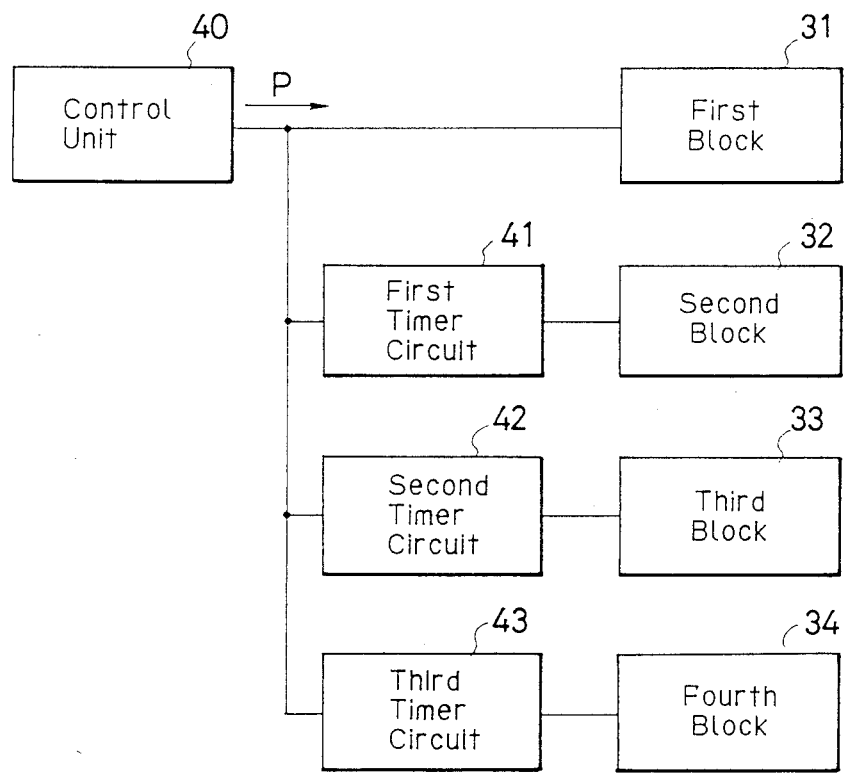
FIG. 2 is a block diagram of the electrical control for the motor of FIG. 1.

As illustrated in FIG. 2, the first block 31 is connected directly to a control unit 40. The second block 32 is connected to the control unit 40 via a first timer circuit 41. Similarly the third and fourth blocks 33 and 34 are connected to the control unit 40 via second and third timer circuits 42 and 43 respectively. The timer circuits trigger triacs or similar control devices for delivery of electrical current to the electromagnet blocks and establish time delays in the energization of the second, third and fourth blocks, so that blocks 31-34 are energized sequentially with a time lag between initial energizations of successively energized blocks sufficient to allow the current in each of the successively energized blocks to reach substantially its steady state level before the next block is energized.

Figure 5:
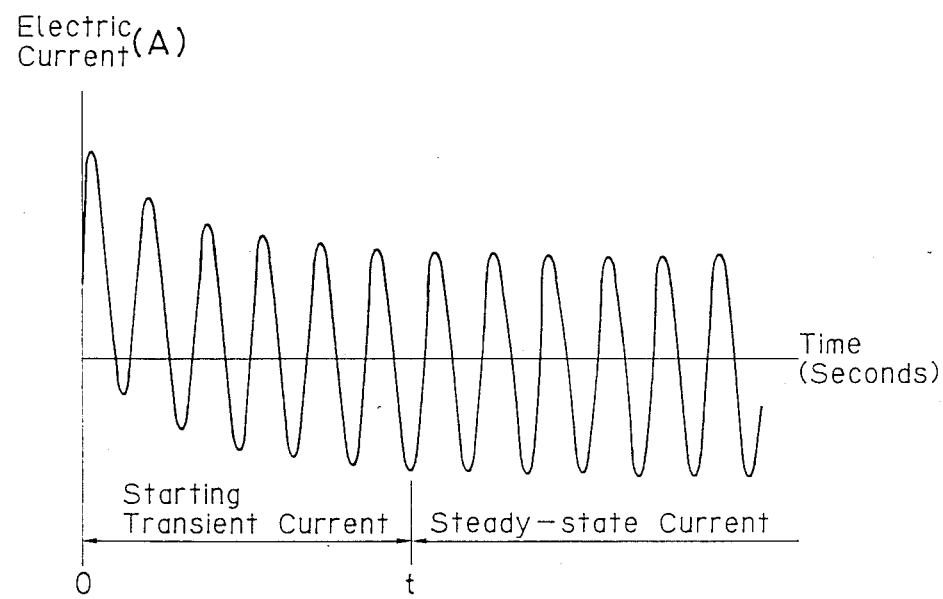
FIG. 5 is a diagram illustrating the magnitude of the current is an electromagnet block during a time interval beginning with initial energization of the block.

In FIG. 5, which illustrates the current drawn by a typical electromagnet in a linear motor, it will be seen that the current drawn when the electromagnet is initially switched on is approximately twice the steady state current. The transient condition exists only for a brief interval t, typically about 60-70 milliseconds. Thereafter, the current is substantially at the steady state level.

Figure 3:
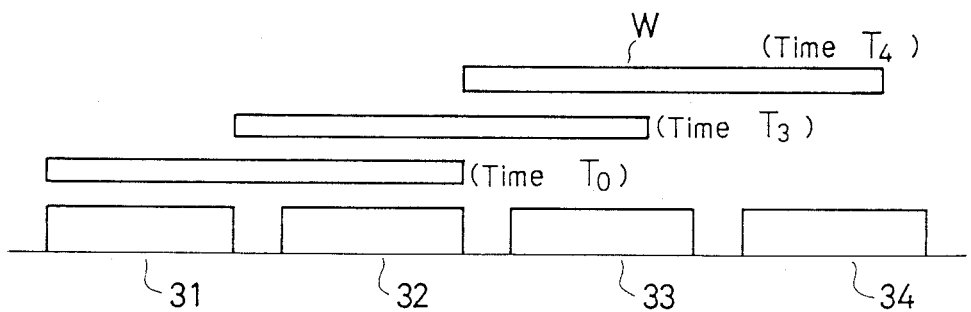
FIG. 3 is a schematic diagram showing relative positions of the moving body and the electromagnet blocks at several different instants of time during start-up.
Figure 4:
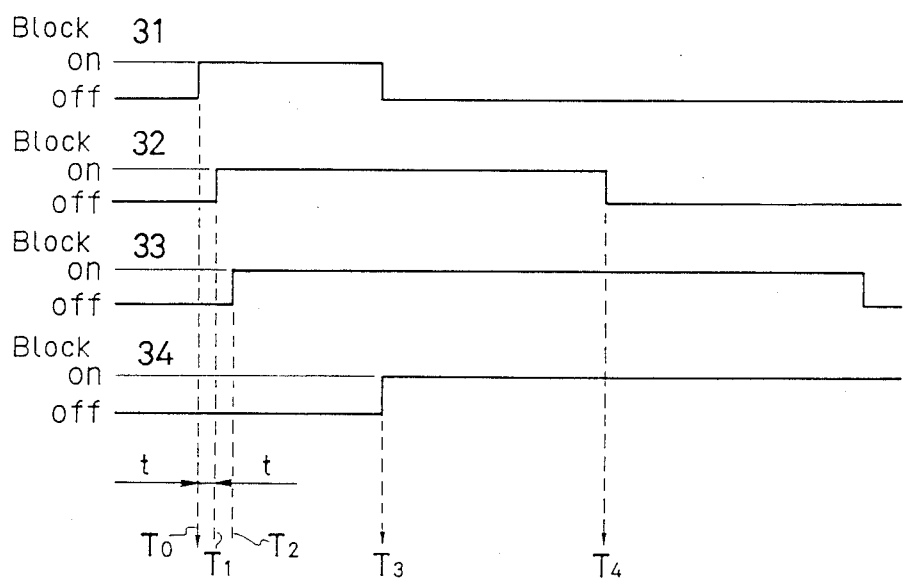
FIG. 4 is a diagram illustrating the timing of the energizations of the blocks in FIG. 1.

Referring to FIGS. 3 and 4, the moving body W is initially stationary and located above blocks 31 and 32. For the purpose of illustration, it will be assumed that the steady state current drawn by each primary electromagnet is 10 amperes, and that the current drawn by each primary electromagnet when initially switched on is 20 amperes. At time $T_0$, an instruction signal P is given by control unit 40 in order to start movement of moving body W. At this time each of the primary electromagnets 21 and 22 draws a transient current of 20 amperes for a total of 40 amperes drawn on the power supply.

Energization of the first block causes a propelling force to be generated between block 31 and a secondary magnet or magnets aboard the moving body W, and the moving body begins to move.

After the lapse of a brief interval t, namely at time $T_1$, the second block 32 is energized via timer circuit 41. At time $T_1$, the transient condition in block 31 is substantially over, and the total current drawn by the two primary electromagnets of block 31 is the steady state current of 20 amperes. The second block 32 initially draws a transient current of 40 amperes, so that the total current drawn on the power supply is 60 amperes.

After a further brief time interval t (at time $T_2$, 2t after starting), current is supplied to the third block 33 via timer circuit 42. At this time the currents drawn by blocks 31 and 32 are at their steady state levels of 20 amperes in each block for a total of 40 amperes for blocks 31 and 32. Block 33 draws a transient current of 40 amperes, and the total current drawn on the power supply at the time block 33 is switched on is 80 amperes.

At time $T_3$, moving body W has already moved past the first block 31, and there is no longer any need to energize block 31. Therefore the control unit 40 can cut off current to block 31. At time $T_3$, or shortly thereafter, starting current can be applied to block 34 via timer circuit 43.

At time $T_4$, when the moving body has moved past the zone of influence of block 32, timer 41 can cut off current to block 32. In a similar manner, as the moving body advances, the succeeding blocks (not shown) are sequentially energized, and current is cut off to the blocks which the moving body has already passed. By cutting off current to the blocks sequentially, the total number of blocks served by the power supply at any given time can be held at a predetermined maximum, e.g. three, so that the power supply need have no greater capacity than necessary to supply the maximum number of blocks simultaneously energized, with no more than one of that number of blocks drawing the transient current at any given instant.

As the moving body W advances, a starting transient current is drawn as each block is initially energized, and the current rapidly diminishes to the steady state level. The total current drawn on the power supply is limited to the sum of the peak transient current for one block and the steady state currents for two blocks. In the example shown and described, the peak current required of the power supply is 80 amperes, whereas in a conventional system having an equivalent motive power, a power supply capable of delivering 120 amperes is required.

The linear motor of the invention can take various forms. For example, each block can consist of one electromagnet, or multiple electromagnets. The total number of blocks energized at any given time can be varied, and numerous other modifications can be made without departing from the scope of the invention as defined in the claims.

We claim:

1. An electrifying system for accelerating a linear motor from a standing position comprising a moving body having a secondary member and a plurality of primary members arranged along a running path of said moving body, characterized in that said primary members are divided into blocks comprising one or more primary members which are electrified simultaneously, and said blocks are electrified sequentially with a time lag required for a starting transient state to disappear.

2. In a linear motor comprising a moving body and a plurality of electromagnets arranged along the path of the moving body, the electromagnets being divided into blocks, each block comprising at least one electromagnet, an energizing system for energizing the electromagnets comprising means for energizing said blocks sequentially with all of the electromagnets in each block being energized simultaneously, said energizing means, at least during an interval in which said moving body is accelerating from a standing position, establishing a time lag between initial energizations of successively energized blocks sufficient to allow the current in each of said successively energized blocks to reach substantially its steady state level before the next block is energized.

3. A linear motor according to claim 2 in which said time lag between initial energizations of successively energized blocks is at least approximately 60 milliseconds.

4. A linear motor according to claim 2 in which said time lag between initial energizations of successively energized blocks is approximately 60 to 70 milliseconds.

5. A linear motor according to claim 2 in which said time lag between initial energizations of successively energized blocks is not greater than approximately 70 milliseconds.

6. A linear motor according to claim 2 in which said energizing means sequentially deenergizes said blocks.

7. A linear motor according to claim 2 in which said energizing means sequentially deenergizes said blocks as the moving body passes said blocks.

8. A linear motor according to claim 2 in which said energizing mean deenergizes the first block to be energized at least as early as the time at which an nth block is energized whereby the maximum number of blocks simultaneously energized during start-up of the motor is $n-1$.

9. A linear motor according to claim 2 in which said energizing means deenergizes the first block to be energized at least as early as the time at which a fourth block is energized whereby the maximum number of blocks simultaneously energized during start-up of the motor is 3.

10. A method of operating a linear motor having a moving body and a plurality of electromagnets arranged along the path of the moving body, the electromagnets being divided into blocks, each block comprising at least one electromagnet, comprising energizing said blocks sequentially with all of the electromagnets in each block being energized simultaneously, and, at least during an interval in which said moving body is accelerating from a standing position, establishing a time lag between initial energizations of successively energized blocks sufficient to allow the current in each of said successively energized blocks to reach substantially its steady state level before the next block is energized.

* * * * *